(12) United States Patent
Pandit et al.

(10) Patent No.: US 7,543,333 B2
(45) Date of Patent: Jun. 2, 2009

(54) ENHANCED COMPUTER INTRUSION DETECTION METHODS AND SYSTEMS

(75) Inventors: Bhalchandra S. Pandit, Redmond, WA (US); Praerit Garg, Kirkland, WA (US); Richard B. Ward, Redmond, WA (US); Paul J. Leach, Seattle, WA (US); Scott A. Field, Redmond, WA (US); Robert P. Reichel, Redmond, WA (US); John E. Brezak, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 552 days.

(21) Appl. No.: 10/118,808

(22) Filed: Apr. 8, 2002

(65) Prior Publication Data

US 2003/0191953 A1 Oct. 9, 2003

(51) Int. Cl.
  G06F 21/06 (2006.01)
  G06F 21/20 (2006.01)
  G06F 21/22 (2006.01)
  G06F 21/24 (2006.01)
  G08B 23/00 (2006.01)
  G06F 15/173 (2006.01)
  H04K 1/00 (2006.01)

(52) U.S. Cl. .................... 726/23; 709/224; 709/225; 713/182

(58) Field of Classification Search ................ 701/201; 726/8, 23; 709/224–225; 713/182
See application file for complete search history.

(56) References Cited

U.S. PATENT DOCUMENTS

| | | | | |
|---|---|---|---|---|
| 5,689,565 A * | 11/1997 | Spies et al. | ............... | 713/189 |
| 5,864,665 A * | 1/1999 | Tran | ............... | 713/201 |
| 6,088,451 A * | 7/2000 | He et al. | ............... | 726/8 |
| 6,405,318 B1 * | 6/2002 | Rowland | ............... | 726/22 |
| 6,411,309 B1 * | 6/2002 | Ly | ............... | 715/733 |
| 6,490,679 B1 * | 12/2002 | Tumblin et al. | ............... | 713/155 |
| 6,647,400 B1 * | 11/2003 | Moran | ............... | 707/205 |
| 6,671,810 B1 * | 12/2003 | Jardin | ............... | 726/3 |
| 6,859,878 B1 * | 2/2005 | Kerr et al. | ............... | 713/183 |
| 6,904,449 B1 * | 6/2005 | Quinones | ............... | 709/203 |
| 7,055,032 B2 * | 5/2006 | Sandhu et al. | ............... | 713/171 |
| 7,096,494 B1 * | 8/2006 | Chen | ............... | 726/9 |
| 7,124,299 B2 * | 10/2006 | Dick et al. | ............... | 713/178 |
| 7,194,764 B2 * | 3/2007 | Martherus et al. | ............... | 726/8 |
| 7,216,361 B1 * | 5/2007 | Roskind et al. | ............... | 726/9 |
| 7,278,023 B1 * | 10/2007 | Siegel et al. | ............... | 713/183 |
| 7,428,749 B2 * | 9/2008 | McGarvey et al. | ............... | 726/8 |
| 2001/0034841 A1 * | 10/2001 | Shambroom | ............... | 713/201 |
| 2002/0087545 A1 * | 7/2002 | Bright et al. | ............... | 707/10 |
| 2002/0150253 A1 * | 10/2002 | Brezak et al. | ............... | 380/281 |
| 2003/0088516 A1 * | 5/2003 | Remer et al. | ............... | 705/59 |

* cited by examiner

*Primary Examiner*—Syed A. Zia
*Assistant Examiner*—Trang Doan
(74) *Attorney, Agent, or Firm*—Lee & Hayes, PLLC (57) ABSTRACT

Improved intrusion detection and/or tracking methods and systems are provided for use across various computing devices and networks. Certain methods, for example, form a substantially unique audit identifier during each authentication/logon process. One method includes identifying one or more substantially unique parameters that are associated with the authentication/logon process and encrypting them to form at least one audit identifier that can then be generated and logged by each device involved in the authentication/logon process. The resulting audit log file can then be audited along with similar audit log files from other devices to track a user across multiple platforms.

39 Claims, 4 Drawing Sheets

ENHANCED COMPUTER INTRUSION DETECTION METHODS AND SYSTEMS

TECHNICAL FIELD

This invention relates generally to computer devices and computer networks, and more particularly to methods and systems that provide enhanced computer device intrusion detection.

BACKGROUND

Computer account identity theft continues to be a problem. In a typical scenario, an unscrupulous user gains unauthorized access (i.e., hacks into) a vulnerable computer system. Once inside the computer system the thief locates and steals one or more user identities (or credentials) that can be used to gain access to other computer systems, resources and/or networks. The thief may then masquerade as the user victim in accessing and hacking into the other computer systems and/or networks. This unfortunate stolen identity process can then be repeated over and over again making it nearly impossible, given today's average computer system/network, to catch such an impersonator and determine who they really are.

Consequently, with the continued growth of the Internet and other like intranets, there is a growing need for improved intrusion detection and tracking methods and systems.

SUMMARY

Improved intrusion detection and/or tracking methods and systems are provided.

The above stated needs and others are satisfied by a method for forming an audit identifier that is substantially unique to an authentication process, in accordance with certain implementations of the present invention. The method includes identifying one or more parameters that are associated with the authentication process and encrypting them to form at least one audit identifier. Preferably, at least one of the parameter(s) identified is substantially unique to the authentication process. The resulting audit identifier can then be logged in an audit file for subsequent audit analysis. Various devices that have access to the same parameters can also generate matching audit identifiers, such that devices/users activities can be tracked across multiple platforms during an auditing process.

In certain implementations, for example, several unique logon parameters are identified in a Kerberos ticket-granting service (TGS) message that is either sent or received by the logging device. Exemplary parameters include a user identifying parameter, a timestamp identifying parameter, a domain identifying parameter, a realm identifying parameter, an expiration time identifying parameter, a group identifying parameter, a successful logon count identifying parameter, a session key identifying parameter, a device identifier parameter, a device network address parameter, and/or other like types of parameters/data.

In certain implementations, for example, the parameter(s) are hashed using an MD5 hash algorithm or the like to form the unique audit identifier.

BRIEF DESCRIPTION OF THE DRAWINGS

A more complete understanding of the various methods and systems of the present invention may be had by reference to the following detailed description when taken in conjunction with the accompanying drawings wherein.

DETAILED DESCRIPTION

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
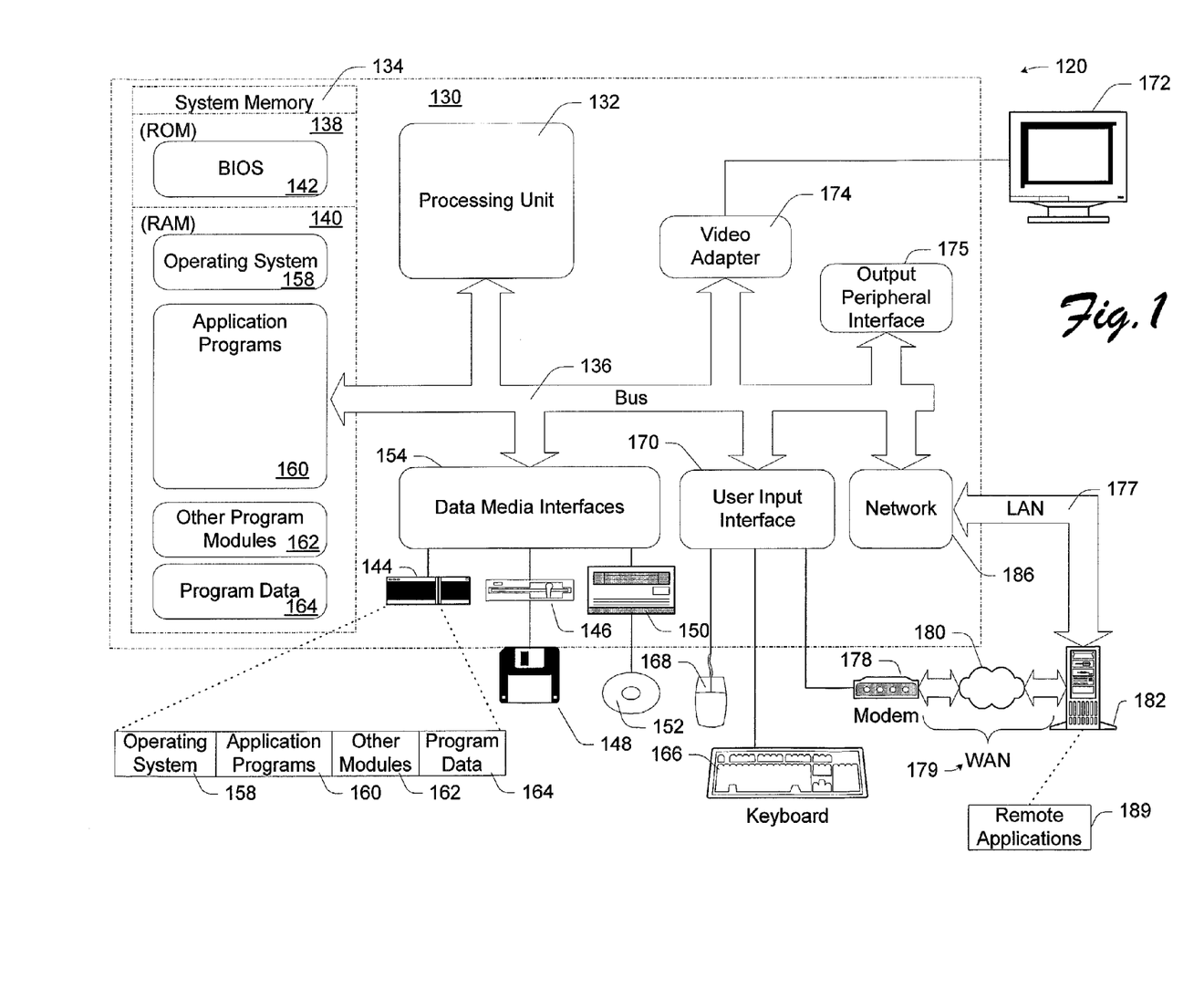
FIG. 1 is a block diagram generally illustrating an exemplary computer system suitable for use with certain implementations of the present invention.

FIG. 1 illustrates an example of a suitable computing environment 120 on which the subsequently described methods and systems may be implemented. Exemplary computing environment 120 is only one example of a suitable computing environment and is not intended to suggest any limitation as to the scope of use or functionality of the improved methods and systems described herein. Neither should computing environment 120 be interpreted as having any dependency or requirement relating to any one or combination of components illustrated in computing environment 120.

The improved methods and systems herein are operational with numerous other general purpose or special purpose computing system environments or configurations. Examples of well known computing systems, environments, and/or configurations that may be suitable include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 1, computing environment 120 includes a general-purpose computing device in the form of a computer 130. The components of computer 130 may include one or more processors or processing units 132, a system memory 134, and a bus 136 that couples various system components including system memory 134 to processor 132.

Bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 130 typically includes a variety of computer readable media. Such media may be any available media that is accessible by computer 130, and it includes both volatile and non-volatile media, removable and non-removable media.

In FIG. 1, system memory 134 includes computer readable media in the form of volatile memory, such as random access memory (RAM) 140, and/or nonvolatile memory, such as read only memory (ROM) 138. A basic input/output system (BIOS) 142, containing the basic routines that help to transfer information between elements within computer 130, such as during start-up, is stored in ROM 138. RAM 140 typically contains data and/or program modules that are immediately accessible to and/or presently being operated on by processor 132.

Computer 130 may further include other removable/non-removable, volatile/non-volatile computer storage media. For example, FIG. 1 illustrates a hard disk drive 144 for reading from and writing to a non-removable, non-volatile magnetic media (not shown and typically called a "hard drive"), a magnetic disk drive 146 for reading from and writing to a removable, non-volatile magnetic disk 148 (e.g., a "floppy disk"), and an optical disk drive 150 for reading from or writing to a removable, non-volatile optical disk 152 such as a CD-ROM/R/RW, DVD-ROM/R/RW/+R/RAM or other optical media. Hard disk drive 144, magnetic disk drive 146 and optical disk drive 150 are each connected to bus 136 by one or more interfaces 154.

The drives and associated computer-readable media provide nonvolatile storage of computer readable instructions, data structures, program modules, and other data for computer 130. Although the exemplary environment described herein employs a hard disk, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 148, optical disk 152, ROM 138, or RAM 140, including, e.g., an operating system 158, one or more application programs 160, other program modules 162, and program data 164.

The improved methods and systems described herein may be implemented within operating system 158, one or more application programs 160, other program modules 162, and/or program data 164.

A user may provide commands and information into computer 130 through input devices such as keyboard 166 and pointing device 168 (such as a "mouse"). Other input devices (not shown) may include a microphone, joystick, game pad, satellite dish, serial port, scanner, camera, etc. These and other input devices are connected to the processing unit 132 through a user input interface 170 that is coupled to bus 136, but may be connected by other interface and bus structures, such as a parallel port, game port, or a universal serial bus (USB).

A monitor 172 or other type of display device is also connected to bus 136 via an interface, such as a video adapter 174. In addition to monitor 172, personal computers typically include other peripheral output devices (not shown), such as speakers and printers, which may be connected through output peripheral interface 175.

Computer 130 may operate in a networked environment using logical connections to one or more remote computers, such as a remote computer 182. Remote computer 182 may include many or all of the elements and features described herein relative to computer 130.

Logical connections shown in FIG. 1 are a local area network (LAN) 177 and a general wide area network (WAN) 179. Such networking environments are commonplace in offices, enterprise-wide computer networks, intranets, and the Internet.

When used in a LAN networking environment, computer 130 is connected to LAN 177 via network interface or adapter 186. When used in a WAN networking environment, the computer typically includes a modem 178 or other means for establishing communications over WAN 179. Modem 178, which may be internal or external, may be connected to system bus 136 via the user input interface 170 or other appropriate mechanism.

Depicted in FIG. 1, is a specific implementation of a WAN via the Internet. Here, computer 130 employs modem 178 to establish communications with at least one remote computer 182 via the Internet 180.

In a networked environment, program modules depicted relative to computer 130, or portions thereof, may be stored in a remote memory storage device. Thus, e.g., as depicted in FIG. 1, remote application programs 189 may reside on a memory device of remote computer 182. It will be appreciated that the network connections shown and described are exemplary and other means of establishing a communications link between the computers may be used.

Network access control, in accordance with certain exemplary implementations of the present invention, is provided by user authentication integrated with and/or otherwise supported by a Kerberos protocol. Under the Kerberos protocol, when a client device or machine wants to establish a session with a service/server device or machine, the client needs to be in possession a session key and a session ticket for the purpose of authenticating the client (e.g., user) with the service. The session key and the session ticket are issued by a Kerberos key distribution center (KDC) upon request of the client. Since the KDC is itself a service, the client must first obtain a session key and a session ticket for the transactions with the KDC before it can request session keys and tickets for other services. This special session ticket for communicating with the KDC is a ticket-granting ticket (TGT), and the associated session key is a logon session key. When the client wants to access a service other than the KDC, it sends a request, including the TGT, to the KDC for a session ticket for that service. The KDC responds to the request by issuing a session ticket for the target service to the client, which then uses the service session ticket to access the target service.

Figure 2:
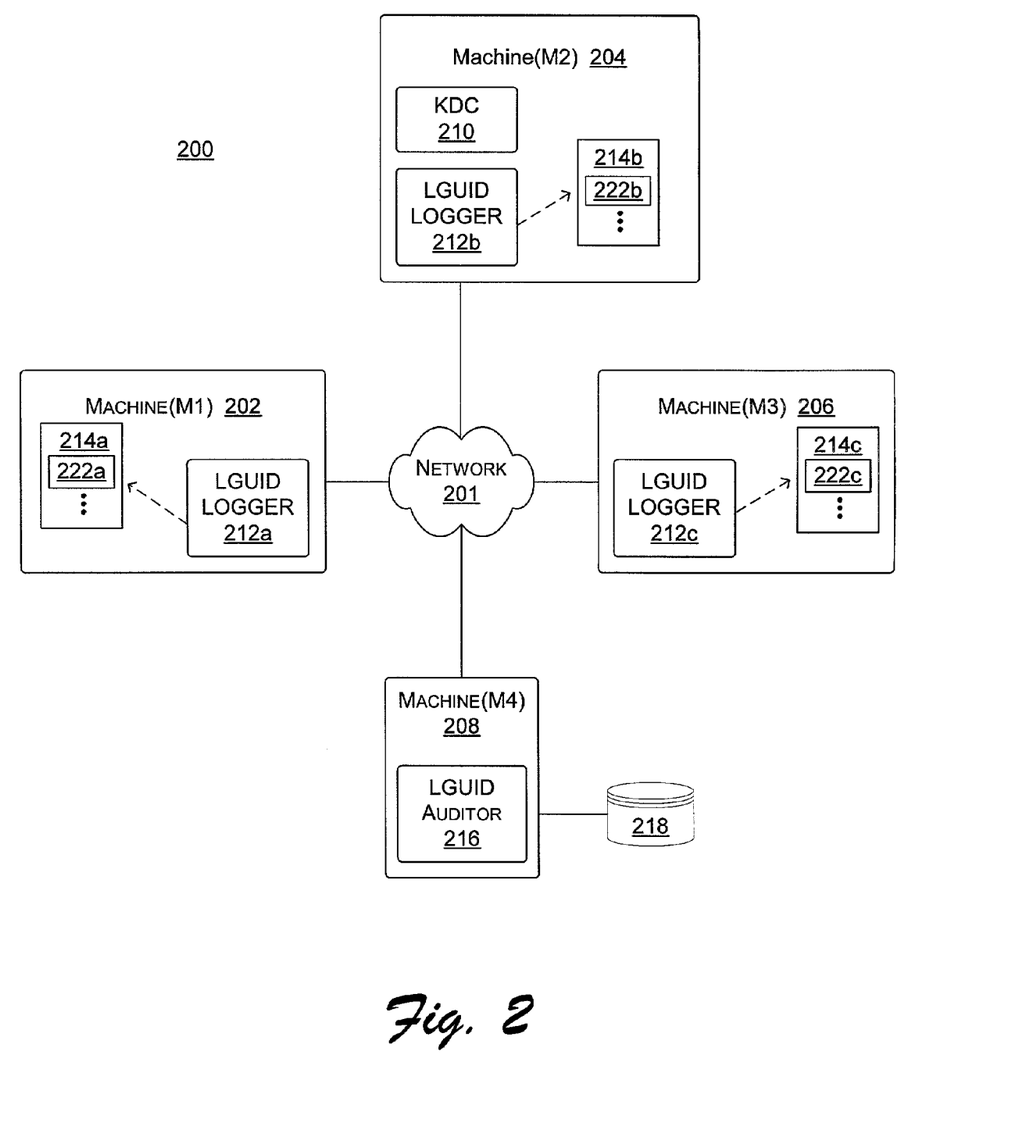
FIG. 2 is a block diagram depicting several machines, e.g., computer systems as in FIG. 1, operatively coupled to a network and configured to perform/support logon globally unique identifier (LGUID) logging and auditing, in accordance with certain exemplary implementations of the present invention.

The Kerberos protocol includes three sub-protocols. The sub-protocol in which KDC 210 gives a client a logon session key and a ticket-granting-ticket is (TGT) is known as the authentication service (AS) exchange. The sub-protocol in which KDC 210 distributes a service session key and a session ticket for a requested service to the client is known as the ticket-granting service (TGS) exchange. The sub-protocol in which the client presents the session ticket for admission to a service is known as the application protocol exchange.

Reference is now to FIG. 2, which is a block diagram of a networked environment 200 having a plurality of machines 202, 204, 206, and 208 that are operatively coupled to a network 201 and configured to perform/support logon globally unique identifier (LGUID) logging and auditing, in accordance with certain exemplary implementations of the present invention.

Preferably, environment 200 is configured to provide a high degree of security and hence trustworthiness such that unauthorized identity changes are rare. Unfortunately, there may be times when an unscrupulous user locates and exploits a security weakness that essentially allows for an online identity theft. Until now, it has been difficult if not impossible to determine when a thief begins masquerading as another user. In accordance with certain aspects of the present invention, the LGUID logging/auditing methods and systems presented herein can uncover and expose such illegal activity by causing the thief to unknowingly leave a trail of discoverable breadcrumbs (e.g., logged audit events) that can be followed from machine to machine during an audit to ascertain their true identity.

Each of the machines 202, 204, 206, and 208 is representative of a device, such as, e.g., a computer device as in FIG. 1, or other like device. Network 201 is representative of any communication system/link capable of supporting the desired communication between the devices. In certain implementations, for example, network 201 includes the Internet.

Machine 202 (hereinafter referred to simply as M1) includes a LGUID logger 212a that is configured to support the exemplary logging/auditing methods and systems provided herein. In the examples that follow M1 is assumed to act as a client device. LGUID logger 212a is configured to record an audit log 214a having at least one audit event entry 222a associated with certain audit events that occur during the operation of M1.

Machine 204 (hereinafter referred to simply as M2) includes a LGUID logger 212b that is also configured to support the exemplary logging/auditing methods and systems provided herein. In the examples that follow M2 is assumed to act as a trusted third-party server device that is capable of authenticating specific users/devices. As such, in this example M2 is shown has having a KDC 210. LGUID logger 212b is configured to record an audit log 214b having at least one audit event entry 222b associated with certain audit events that occur during the operation of M2.

Machine 206 (hereinafter referred to simply as M3) includes a LGUID logger 212c that is also configured to support the exemplary logging/auditing methods and systems provided herein. In the examples that follow M3 is assumed to act as a server device capable of being accessed by a user of M1 when M1 provides the proper authentication information (e.g., a session ticket/message) generated by M2. LGUID logger 212c is configured to record an audit log 214c having at least one audit event entry 222c associated with certain audit events that occur during the operation of M3.

Machine 208 (hereinafter referred to simply as M4) includes a LGUID auditor 216 that is configured to support the exemplary logging/auditing methods and systems provided herein. In the examples that follow M4 is assumed to act as a server device capable of capable of receiving or otherwise accessing all or portions of audit logs 214a, 214b and 214c from M1, M2 and M3, respectively. M4 may store audit data and other like information in a database 218, for example.

Figure 3:
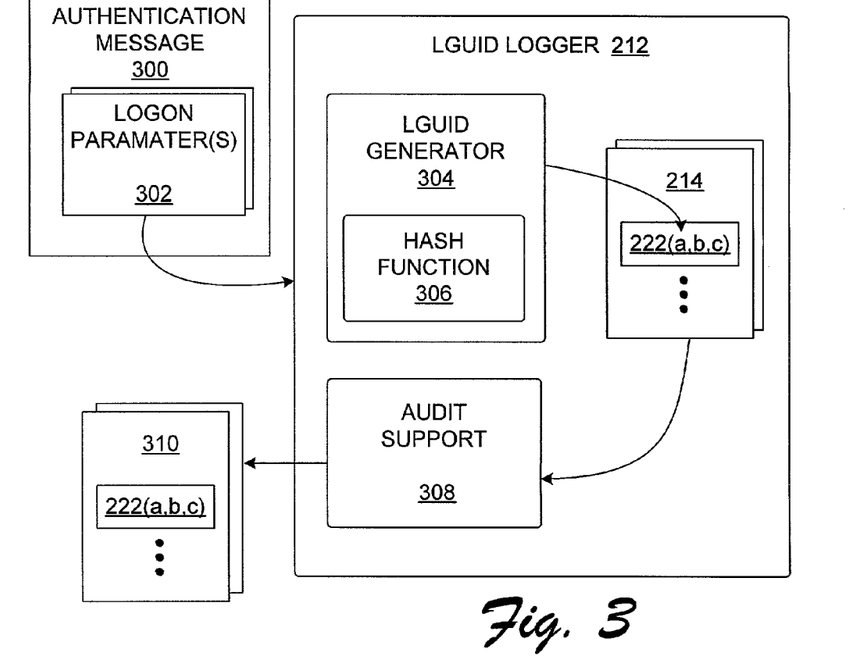
FIG. 3 is a block diagram depicting certain features associated with a machine, e.g., as in FIG. 2, employed to perform/support logon globally unique identifier (LGUID) logging and auditing, in accordance with certain exemplary implementations of the present invention.

FIG. 3 is a block diagram depicting certain exemplary features/operations associated with a LGUID logger 212 that is configured to perform/support LGUID logging and auditing, in accordance with certain further implementations of the present invention.

LGUID logger 212 is configured to extract certain information from one or more authentication messages 300 associated with an authenticating logon process. Preferably, the extracted information includes one or more logon parameters 302 or other data that is unique to the logon process and can thusly be traced back to the user/device that is involved in the authenticating logon process. By way of example, in environment 200 of FIG. 2, LGUID loggers 212a, 212b and 212c can be configured to extract information from a TGS ticket. In this example the extracted logon parameters would include one or more TGS ticket/message parameters that uniquely identify the user/device that is involved in the authenticating logon process. Hence, in certain implementations a user identifier and timestamp may be extracted. Other information, such as, e.g., a domain or realm identifier, an expiration time, one or more group identifiers, a session key, or other like information may also/alternatively be extracted by the LGUID logger. As can be seen from this exemplary listing of Kerberos parameters/fields/values (which is not complete), there are a variety of options available and certain logon parameter(s) 302 may prove to be better choices than others depending on the authentication system and/or implementation.

With this in mind, in accordance with certain implementations of the present invention, it is assumed that LGUID logger 212 in FIG. 3 is configured to extract three logon parameters from a TGS ticket. The TGS ticket is either being sent as would be the case for LGUID 212b, or received as would be the case for LGUIDs 212a and 212c in FIG. 2. The first logon parameter is a user identifier, which is a unique name operatively associated with the user account that is authenticated/supported by KDC 210. Note, that the term "unique" as used in this document is intended to also be understood to mean "substantially globally unique". The second logon parameter is a realm identifier that is unique to the realm name that is supported by KDC 210, for example. The third logon parameter is a timestamp that will likely be unique, depending on the resolution of the time measurement. For example, some computer devices have a 64-bit timestamp that is measured in 100 nanosecond increments beginning with some set time in the past. Thus, theoretically, it may be possible for two or more TGS tickets to share the same timestamp.

Nevertheless, in this example, the desired logon parameters 302 are extracted and grouped together (e.g., concatenated) by a LGUID generator 304. The resulting combined parameter is then provided to a one-way encryption process, hash function, message digest, etc., such as, e.g., hash function 306, which produces corresponding data that is called a LGUID. In certain preferred implementations, for example, hash function 306 includes an MD5 hash function.

The resulting LGUID is then logged in an audit log 214 as part of an audit event 222. Subsequently (or simultaneously) an audit support function 308 can produce/send an audit report 310 that includes, for example, one or more audit events 222. With reference to FIG. 2, for example, an audit report 310 from M2 could be sent over network 201 to LGUID auditor 216 of M4. LGUID auditor 216 can actively/ dynamically and/or passively collect/receive a plurality of audit reports from various machines in this manner.

Figure 4:
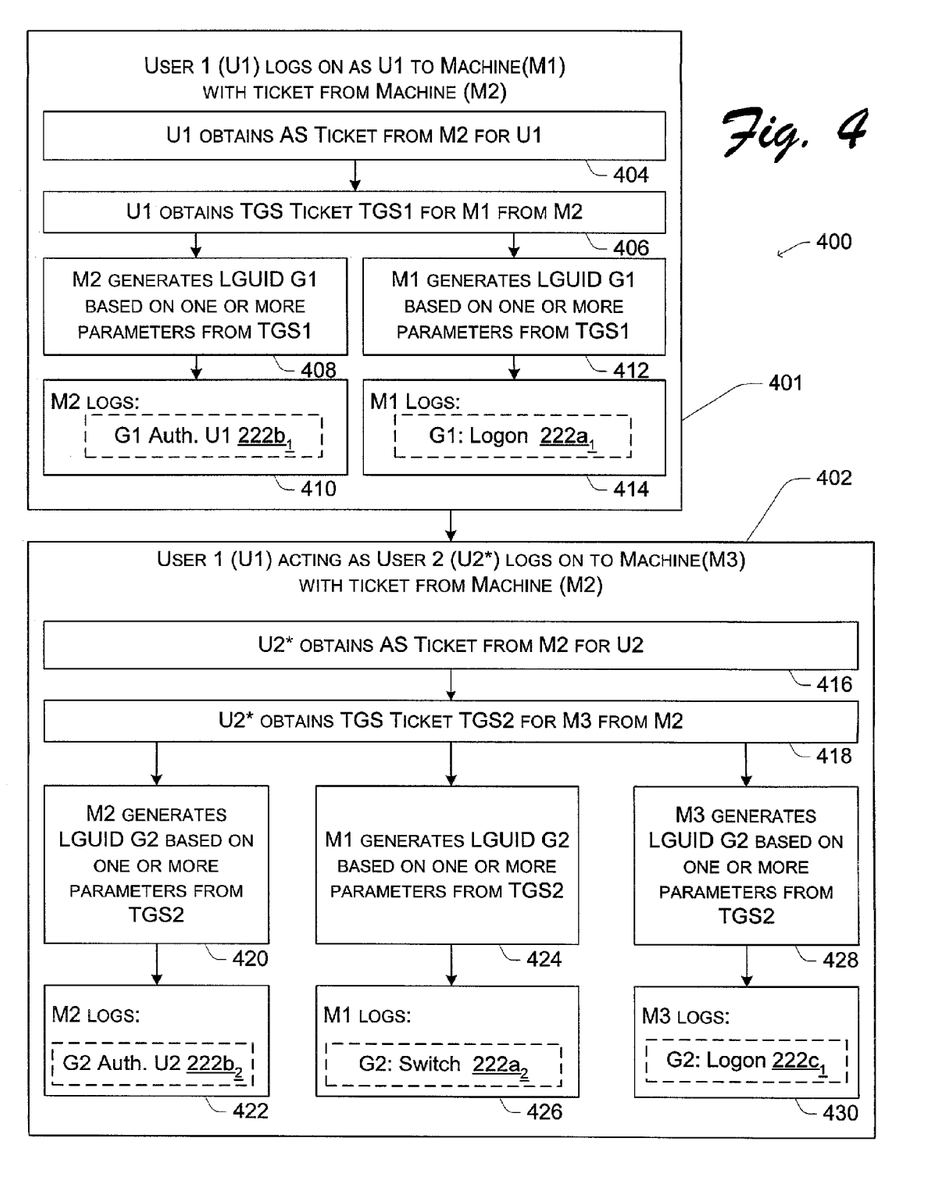
FIG. 4 is a flow diagram depicting a process with a machine, e.g., as in FIG. 3, employed to log logon globally unique identifiers (LGUIDs), in accordance with certain exemplary implementations of the present invention.

Attention is now drawn to FIG. 4, which is a flow diagram depicting an exemplary LGUID logging process 400 that corresponds to machines M1, M2 and M3 as illustrated in environment 200. In this example, there are two logon activities represented by steps 401 and 402. In step 401, a user #1 (U1) logs on as U1 to M1 with a ticket from KDC 210 in M2. Subsequently, in step 402, the same U1 makes an unwise decision to get a logon ticket to M3 using the stolen logon credentials of user #2 (U2). Note that in FIG. 4, whenever U1 is masquerading as U2, the symbol U2* is used.

Within step 401 there are several additional steps that occur. In step 404, U1 obtains an AS ticket from M2 using U1 credentials (e.g., user name/password combination). In step 406, U1 obtains a TGS ticket (TGS1) for M1 from M2.

At this point, in this exemplary timeline, it is time to log an audit event 222 at both machines, M1 and M2. So, in step 408, M2 generates an LGUID (G1) based on logon parameters 302 in TGS1. Next, in step 410, M2 logs an audit event $222b_1$. Audit event $222b_1$, for example, may record that U1 successfully authenticated and the associated LGUID (G1). In step 412, M1 also generates the same LGUID (G1) based on the same logon parameters 302. Then, in step 414, M1 logs an audit event $222a_1$. Audit event $222a_1$, for example, may record the U1 logon and the LGUID (G1).

Within step 402 there are also several additional steps that occur. In step 416, U2* obtains an AS ticket from M2 for U2. In step 418, U2* obtains a TGS ticket (TGS2) from KDC 210 in M2; TGS2 is for M3. Then U2* logs on to M3.

Now once again at this point of this exemplary timeline, it is time to log another audit event 222 at machines M1, M2 and now also the targeted M3. Thus, in step 420, M2 generates an LGUID (G2) based on logon parameters 302 in TGS2. In step 422, M2 logs an audit event $222b_2$. Audit event $222b_2$, for example, may record that U2 (actually U2*, but M2 does not know this) successfully authenticated and the associated LGUID (G2).

With regard to machine M1, in step 424, M1 also generates the same LGUID (G2) based on the same logon parameters 302 in TGS2. Then, in step 426, M1 logs an audit event $222a_2$. Audit event $222a_2$, for example, preferably records the fact that U1 changed identity by explicitly supplying the credentials of another user, namely U2. This important user "switching" information is recorded along with LGUID (G2).

Not to be left out, M3 also in possession of TGS2, generates LGUID (G2) based on the same logon parameters 302 in TGS2, in step 428. Then, in step 422, M3 logs an audit event $222c_1$. Audit event $222c_1$, for example, may record the U2 (actually U2*, but M3 does not know this) logon and the LGUID (G2).

Having now recorded the unauthorized activities of U2* in the applicable audit logs 214 of machines M1, M2 and M3, at some point, LGUID auditor 216 of M4 can receive the audit information in audit reports 310a, 310b and 310c from each machine, respectively. M4 will then process the audit information accordingly.

Figure 5:
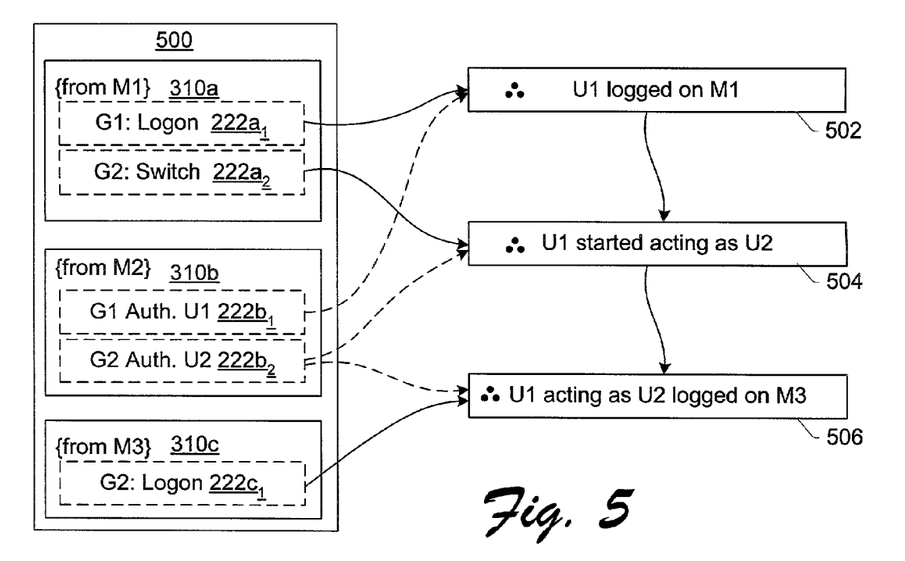
FIG. 5 is a block diagram illustratively depicting an audit event analysis based on information logged by a logon globally unique identifier (LGUID) logging process, e.g., as in FIG. 4, in accordance with certain exemplary implementations of the present invention.

Thus, for example, attention is drawn to FIG. 5, which is a block diagram illustratively depicting an exemplary audit event analysis that may take place within LGUID auditor 216 (FIG. 2).

Audit data 500, which may be stored for example in database 218, includes at least portions of audit reports from one or more reporting/examined machines. Here, for example, audit report 310a is from machine M1 and includes the audit events logged in steps 414 and 426 of FIG. 4. Audit report 310b is from machine M2 and includes the audit events logged in steps 410 and 422 of FIG. 4. Similarly, audit report 310c is from machine M3 and includes the audit event logged in step 430 of FIG. 4.

Based on the audit data 500, certain deductions may be made. For example, deduction 502 is that U1 logged on to M1. The curving arrows illustrate the audit event data that supports the logical deduction being made. Thus, for example, deduction 502 is based on audit events $222a_1$ and, if available, $222b_1$. Audit event $222b_1$ shows that LGUID G1 is associated with user U1, and audit event $222a_1$ establishes that a GI logon event occurred at M1. Thus, in deduction 502 it is deduced that U1 logged on to M1.

Deduction 504 is based on the deduction of 502 and the further evidence provided by audit events $222a_2$ and, if available, $222b_2$. Thus, for example, audit event $222b_2$ shows that LGUID G2 is associated with user U2, and audit event $222a_2$ reveals that a user identity change occurred when LGUID G2 was recorded. Thus, it is therefore known that U1 was logged on to M1 and that the user of M1 (i.e., U1) changed identity to U2. Hence, U1 is now acting as U2 (i.e., U2*).

Finally, in this example, deduction 506 is that U1 acting as U2 (U2*) logged on to M3. This is based on the considerable evidence of an identity change provided by deduction 504 and audit event $222c_1$, which places U2* as having logged on to M3.

Consequently, with the above methods and systems an audit trail across multiple machines is created using the LGUID as a common marker within the collected and logged audit data. In addition to logging an LGUID, certain further implementations also log data that in some way further identifies the device/machine involved in the authentication process. This, for example, LGUID logger 212 (in FIGS. 2 and 3) may include an Internet Protocol (IP) address and/or other machine identifying information in an audit event 222. Note, that an IP address, for example, may be included in the information that is hashed by hash function 306, and/or included in audit event 222 separately. Such machine identifying information could provide additional evidence about various unauthorized activities.

While illustrated within a Kerberos environment, those skilled in the art will recognize that these exemplary methods are adaptable to a wide variety of other logon and/or authentication techniques. Additionally, clearly the information that is logged using the above exemplary methods and systems may also be used for other purposes during an audit analysis.

Thus, although some preferred implementations of the various methods and systems of the present invention have been illustrated in the accompanying Drawings and described in the foregoing Detailed Description, it should be understood that the invention is not limited to the exemplary implementations disclosed, but is capable of numerous rearrangements, modifications and substitutions without departing from the spirit of the invention as set forth and defined by the following claims.

What is claimed is:

1. A method to enable detection of unauthorized access to a platform, the method comprising:
   providing at least one parameter that is associated with an authentication process;
   encrypting said at least one parameter to form at least one audit identifier;
   combining a plurality of parameters associated with said authentication process to form said at least one parameter;
   recording an audit entry in an audit log, the audit entry comprising the at least one audit identifier, an associated audit event and an associated unique device identifier, wherein the audit entry is associated with a principal seeking authentication, wherein the associated unique device identifier includes a device network address associated with the principal seeking authentication; and sending the audit entry to an auditing service over a network, said auditing service being configured to gather and analyze a plurality of audit entries from a plurality of platforms;

wherein said sending enables said auditing service to analyze the recorded audit entry, wherein the plurality of parameters associated with said authentication process comprise:
(i) user identifying information;
(ii) realm identifying information; and
(iii) a timestamp; and wherein the auditing service tracks principal movement and login ID used at each platform of a plurality of platforms by analyzing audit entries associated with said at least one audit identifier and with the principal seeking authentication, the analyzing the associated audit entries comprising:

identifying within the associated audit entries, at least one audit entry that contains an audit event that is a switch event, the switch event indicating that the principle seeking authentication has switched from a first login ID to a second login ID; and deducing that the principle is masquerading as a user associated with the second login ID based on correlation of the switch event with audit identifiers, audit events and unique device identifiers contained in the associated audit entries.

2. The method as recited in claim 1, wherein said parameter is unique to said authentication process.

3. The method as recited in claim 1, wherein said at least one parameter includes at least one logon parameter and said authentication process includes a logon process.

4. The method as recited in claim 1, wherein said at least one audit identifier includes a logon globally unique identifier (LGUID).

5. The method as recited in claim 1, wherein said authentication process includes a client device authentication process.

6. The method as recited in claim 5, wherein said client device authentication process includes a user authentication process.

7. The method as recited in claim 1, wherein said authentication process includes a server device authentication process.

8. The method as recited in claim 1, wherein providing said at least one parameter further includes:
extracting said at least one parameter from at least one message generated during said authentication process.

9. The method as recited in claim 8, wherein said at least one message includes at least one Kerberos protocol message.

10. The method as recited in claim 9, wherein said at least one Kerberos protocol message includes a Kerberos ticket-granting service (TGS) message.

11. The method as recited in claim 1, wherein encrypting said at least one parameter to form said at least one audit identifier includes:
hashing said at least one parameter to form said at least one audit identifier.

12. The method as recited in claim 11, wherein hashing said at least one parameter includes:
processing said at least one parameter using an MD5 hash algorithm to form said at least one audit identifier.

13. A computer-readable medium having computer-executable instructions for executing acts comprising:
identifying data that is associated with an authentication process;
encrypting said data to form corresponding audit identifier data;
storing said audit identifier data in at least one audit file;
combining different data associated with said authentication process to form said data;
recording unique device identifier data and event data associated with said audit identifier data and with a principal seeking authentication, in said at least one audit file, wherein said unique device identifier data includes device network address data associated with a principal seeking authentication; and
providing said at least one audit file to an auditing service over a network;
wherein said auditing service collects and analyzes audit files associated with at least two different devices, and
wherein the auditing service tracks principal movement and login ID used at each device of a plurality of devices by analyzing corresponding unique device identifier data that is associated with said audit identifier data and with the principal seeking authorization, wherein the analyzing comprises:
identifying switch event data associated with a first audit file, the first audit file being associated with a first device, the switch event indicating that the principle seeking authentication has switched from a first login ID to a second login ID;
deducing that the principle is masquerading as a user associated with the second login ID based on correlation of the switch event data in the first audit file with event data in a second audit file, the second audit file being associated with the principal and a second device.

14. The computer-readable medium as recited in claim 13, wherein said data is unique to said authentication process.

15. The computer-readable medium as recited in claim 13, wherein said audit identifier data includes logon globally unique identifier (LGUID) data.

16. The computer-readable medium as recited in claim 13, wherein said authentication process includes a client device authentication process.

17. The computer-readable medium as recited in claim 16, wherein said client device authentication process includes a user authentication process.

18. The computer-readable medium as recited in claim 13, wherein said authentication process includes a server device authentication process.

19. The computer-readable medium as recited in claim 13, wherein identifying data that is associated with said authentication process further includes:
selectively extracting said data from at least one message generated during said authentication process.

20. The computer-readable medium as recited in claim 19, wherein said at least one message includes at least one Kerberos protocol message.

21. The computer-readable medium as recited in claim 20, wherein said at least one Kerberos protocol message includes a Kerberos ticket-granting service (TGS) message.

22. The computer-readable medium as recited in claim 13, wherein encrypting said data to form said audit identifier data includes:
hashing said data to form said audit identifier data.

23. The computer-readable medium as recited in claim 22, wherein hashing said data to form said audit identifier data includes:

processing said data using an MD5 hash algorithm to form said audit identifier data.

24. A system comprising:

memory configurable to store message data associated with an authentication process;

logic operatively coupled to said memory and configurable to extract at least a portion of said message data and encrypt said portion of said message data to form corresponding unique audit identifier data;

wherein said memory is further configurable to store at least one audit log;

said logic is further configurable to:

store audit entry data comprising the unique audit identifier data, associated audit event data and unique device identifier data in said at least one audit log, the audit entry data being associated with an identified principal seeking authentication; and cause said audit entry data to be output in a format suitable for sending over a network link to an external auditing service that is operatively connectable to said logic, such that said external auditing system tracks said identified principal across multiple platforms when said identified principal moves across platforms by logging on to at least a first platform using a first user ID and then logging onto a second platform using a second user ID that is different from the first user ID, wherein the tracking of the identified principle by the external auditing system comprises:

determining that a first audit entry data received from the first platform and a second audit entry data received from the second platform both contain unique audit identifier data that is associated with the second user ID;

identifying that the first audit entry data contains associated audit event data that comprises a switch event, the switch event indicating that the identified principle has switched from the first user ID to the second user ID; and deducing that the identified principle is masquerading as a user associated with the second user ID based on correlation of the switch event with associated audit event data and unique device identifier data of the first and second audit entry data.

25. The system as recited in claim 24, wherein said message data is unique to said authentication process.

26. The system as recited in claim 24, wherein said memory is configurable to store message data that includes at least one logon parameter when said authentication process includes a logon process.

27. The system as recited in claim 26, wherein said logon parameter is selected from a group of parameters comprising a user identifying parameter, a timestamp identifying parameter, a domain identifying parameter, a realm identifying parameter, an expiration time identifying parameter, a group identifying parameter, a session key identifying parameter, a device identifier, and a device network address.

28. The system as recited in claim 24, wherein said audit identifier data includes a logon globally unique identifier (LGUID).

29. The system as recited in claim 24, wherein said authentication process includes a client device authentication process.

30. The system as recited in claim 29, wherein said client device authentication process includes a user authentication process.

31. The system as recited in claim 24, wherein said authentication process includes a server device authentication process.

32. The system as recited in claim 24, wherein said memory is configurable to store message data that includes Kerberos protocol message data.

33. The system as recited in claim 32, wherein said memory is configurable to store message data that includes Kerberos ticket-granting service (TGS) message data.

34. The system as recited in claim 25, wherein said logic is further configured to:

hash said portion of said message data to form said corresponding unique audit identifier data.

35. The system as recited in claim 34, wherein said logic is further configured to:

hash said portion of said message data to form said corresponding unique audit identifier data using an MD5 hash algorithm.

36. The system as recited in claim 24, wherein said logic is further configurable to:

combining a plurality of different parts of said message data to form said portion of said message data.

37. The system as recited in claim 24, wherein said unique device identifier data includes device network address data associated with said principal seeking authentication.

38. The computer-readable medium as recited in claim 13, wherein the second audit file comprises data indicating the principle seeking authentication is attempting to access the second device using the second login ID.

39. The computer-readable medium as recited in claim 13, wherein the analyzing further comprises further deducing that the principle is masquerading as a user associated with the second login ID based on correlation of the switch event data in the first audit file with event data in a third audit file, the third audit file comprising event data associated with the principal and a third device.

* * * * *